Patented Jan. 18, 1944

2,339,259

UNITED STATES PATENT OFFICE 2,339,259

SYNTHESIS OF WOUND HORMONES

James English, Jr., Hamden, Conn., and James Bonner and Arie J. Haagen-Smit, Pasadena, Calif., assignors to California Institute Research Foundation, Pasadena, Calif., a corporation of California No Drawing. Application November 30, 1940, Serial No. 367,950

4 Claims. (Cl. 260—535)

This invention relates to processes for the synthesis of certain wound hormones and to intermediates for use in such synthesis.

Many plant tissue extracts are capable of inducing renewed growth activity in mature plant cells. These growth-inducing extracts are usually obtained from ground or heated tissues and they are capable of evoking cell division and cell enlargement in unwounded cells. Such active principles have been termed "wound hormones."

The present application is concerned more particularly with the synthetic production of 1-decene-1, 10-dicarboxylic acid, which substance has been found to be highly active in stimulating the process of healing wounds in plant tissue.

We have found that 1-decene-1,10-dicarboxylic acid may be synthesized by converting undecylenic acid or alkyl esters thereof to the half aldehyde of sebacic acid, or its alkyl ester, by treatment with a highly active oxidizing agent, such as ozone, for example. The oxidation product is then condensed with malonic acid in the presence of an inert tertiary amine, such as pyridine, to give the corresponding 1,10-dicarboxy-decene-1, or 1-carboxy-10-carbalkoxy-decene-1. If the ester group is present, it may be hydrolyzed off by heating in alkaline medium, and, after acidification, the desired acid is obtained. This series of reactions is outlined in the following flow sheet in which the process is illustrated in terms of methyl undecylenate:

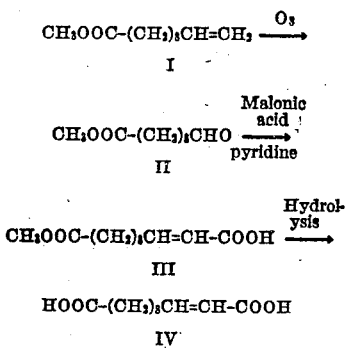

In the examples given below a specific method of carrying out our invention is given. It is to be understood, however, that modifications may be made therein by those skilled in the art without departing from the spirit and scope of our invention.

Example I

Undecylenic acid methyl ester (B. P. 119–120° C., 10 mm.) is ozonized in acetic acid solution to the half aldehyde of methyl sebacate [B. P. 124–125° C. (4 mm.)]. 13 gms. of this product is mixed with 15 gms. of malonic acid and 15 gms. of dry pyridine and heated under reflux for four hours. A vigorous evolution of carbon dioxide occurs in the early stages of the reaction. The resulting clear solution is acidified, poured into water, and extracted with ether. After removal of the pyridine by extraction with dilute hydrochloric acid, the ether is evaporated and the crude product hydrolyzed directly by heating under reflux with three normal sodium hydroxide for two hours. Upon acidification, the 1-decene-1,10-dicarboxylic acid precipitates and is recrystallized from alcohol or acetone, M. P. 165–166° C.

An oxidation of the synthetic product with permanganate in hot water solution gave sebacic acid, identified by melting point (133°) and mixed melting point.

Example II

Undecylenic acid ethyl ester is treated as in Example I. 1-carboxy-10-carbmethoxy-decene-1 is obtained as an intermediate. After alkaline hydrolysis and acidification, 1-decene-1,10-dicarboxylic acid is obtained.

Example III

Undecylenic acid butyl ester is treated as in Example I. 1-carboxy-10-carb-butoxy-decene-1 is obtained as an intermediate. After alkaline hydrolysis and acidification, 1-decene-1,10-dicarboxylic acid is obtained.

Example IV

Undecylenic acid propyl ester is treated as in Example I. 1-carboxy-10-carbpropoxy-decene-1 is obtained as an intermediate. After alkaline hydrolysis and acidification, 1-decene-1,10-dicarboxylic acid is obtained.

Example V

Undecylenic acid isopropyl ester is treated as in Example I. 1-carboxy-10-carbisopropoxy-decene-1 is obtained as an intermediate. After alkaline hydrolysis and acidification, 1-decene-1,10-dicarboxylic acid is obtained.

Example VI

Undecylenic acid is treated according to the process of Example I. 1-decene-1,10-dicarboxylic acid is obtained directly.

We claim:

1. In a process for the production of 1-decene- 1,10-dicarboxylic acid, the steps comprising oxidizing a substance selected from the group consisting of undecylenic acid and alkyl esters thereof to form the half aldehyde of sebacic acid and alkyl esters thereof respectively, and condensing the oxidation product with malonic acid in the presence of an inert tertiary amine.

2. The process comprising oxidizing a substance selected from the group consisting of undecylenic acid and alkyl esters thereof to form the half aldehyde of sebacic acid and alkyl esters thereof respectively, condensing the oxidation product with malonic acid in the presence of an inert tertiary amine under heating, and recovering 1-decene-1,10-dicarboxylic acid.

3. In a process for the production of 1-decene-1,10-dicarboxylic acid, the steps comprising oxidizing an alkyl ester of undecylenic acid to form an alkyl ester of the half aldehyde of sebacic acid, condensing the oxidation product with malonic acid in the presence of an inert tertiary amine under heating, hydrolyzing the condensation product in alkaline medium, and recovering 1-decene-1,10-dicarboxylic acid.

4. In a process for the production of 1-decene-1,10-dicarboxylic acid, the steps comprising oxidizing a methyl ester of undecylenic acid with ozone to form the methyl ester of the half aldehyde of sebacic acid, condensing the oxidation product with malonic acid in the presence of pyridine, under heating, hydrolyzing the condensation product in alkaline medium, and recovering 1-decene-1,10-dicarboxylic acid.

JAMES ENGLISH, JR.
JAMES BONNER.
ARIE J. HAAGEN-SMIT.